D'ORSAY McCALL WHITE.
FAN CONSTRUCTION.
APPLICATION FILED JULY 12, 1920.
1,381,687.
Patented June 14, 1921.
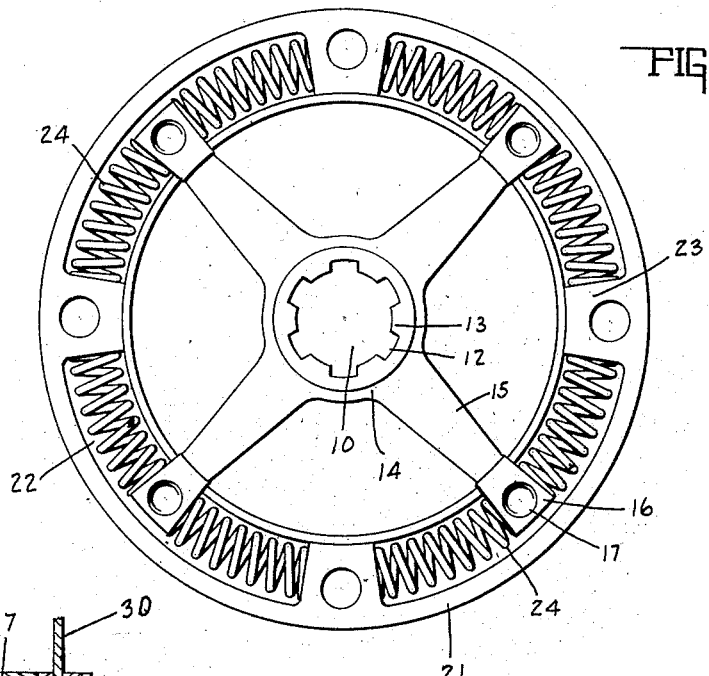
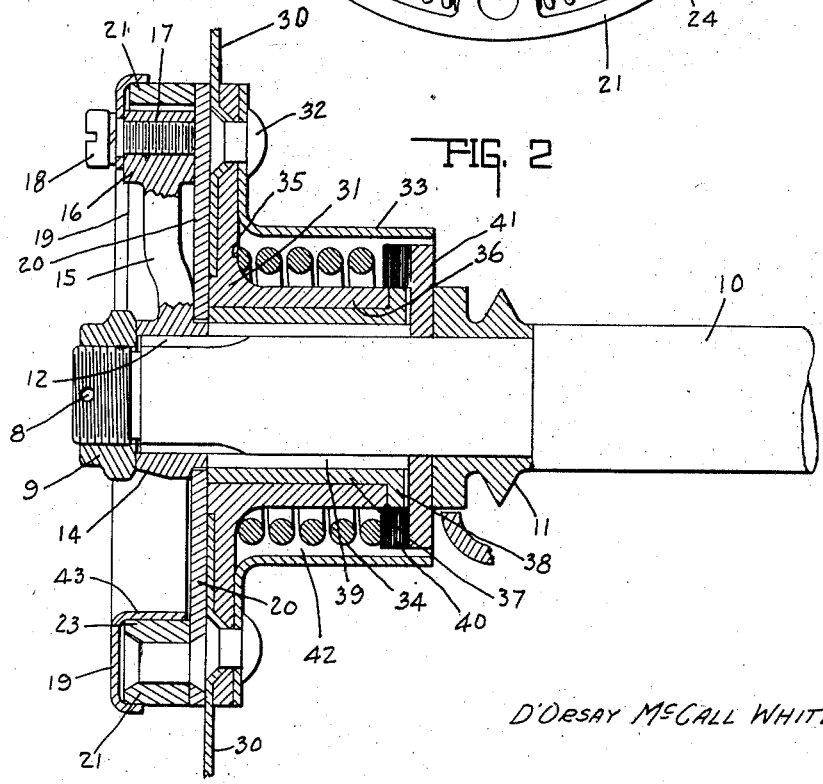
D'ORSAY McCALL WHITE
INVENTOR.
BY
*Lockwood & Lockwood*
ATTORNEYS.

UNITED STATES PATENT OFFICE.

D'ORSAY McCALL WHITE, OF INDIANAPOLIS, INDIANA, ASSIGNOR TO LA FAYETTE MOTORS COMPANY, OF INDIANAPOLIS, INDIANA, A CORPORATION OF DELAWARE.

FAN CONSTRUCTION.

1,381,687.  Specification of Letters Patent.  Patented June 14, 1921.

Application filed July 12, 1920. Serial No. 395,706.

*To all whom it may concern:*

Be it known that I, D'ORSAY MCCALL WHITE, a subject of the Kingdom of Great Britain, and a resident of Indianapolis, county of Marion, and State of Indiana, have invented a certain new and useful Fan Construction; and I do hereby declare that the following is a full, clear, and exact description thereof, reference being had to the accompanying drawings, in which like numerals refer to like parts.

This invention relates to power driven rotary fans, and in particular to fan constructions employed upon internal combustion engines.

The chief object of this invention is to provide a power driven fan with improved means between the power actuating means and fan, whereby sudden changes of speed and shocks from the internal combustion engine or motor will be compensated for or cushioned when very excessive.

The chief feature of the invention consists in including a yielding friction clutch drive and a spring cushion drive between the driving shaft and the fan means.

The full nature of the invention will be understood from the accompanying drawings and the following description and claims:

In the drawings, Figure 1 is a plan view of the invention showing the cushioned driving connection, the cover being removed from the fan construction. Fig. 2 is a central cross sectional view of the fan construction showing in detail the friction driving construction.

In the drawings 10 indicates the driving shaft which may be the forward end of the crank shaft of an internal combustion engine, 11 indicates a bearing therefor, and 12 indicates the splining grooves, said grooves being in spaced relation with each other about the shaft. The grooves are adapted to receive the splines or tongues 13 of the spider construction 14 provided with a plurality of arms 15 in spaced relation with each other and the spider hub. The spider 14 is secured upon the shaft 10 against longitudinal movement by means of the nut 9 threaded upon the reduced and threaded end of the shaft 10 and locked thereto by suitable pin means 8, such as a cotter pin or the like. Each one of the driving arms 15 terminates in a driving lug 16, and each driving lug is provided with a threaded opening 17 adapted to receive a bolt 18 by means of which the cover plate 19 incloses the forward end of the fan housing or construction.

The friction driving disk 20 is provided with a forwardly and circumferentially extending flange or rim 21, said flange coöperating with the cover plate 19 to form a driving chamber 22 in which is positioned the driving spider 14. Extending radially and inwardly from the rim 21 and extending outwardly and forwardly from the plate portion 20 are a plurality of driving members or lugs 23. As shown clearly in Fig. 1 in the present instance, the spider is provided with four arms in spaced relation, and the friction disk or plate 20 is provided with four coöperating driven lugs 23, said driving lugs 16 being interposed between pairs of driven lugs. Between each driving lug and driven lug is a cushioning means, such as the coiled spring 24, whereby power will be transmitted from the shaft 10 to the friction driving disk 20, such that sudden accelerations or retardations of the rotation and speed of the shaft will be cushioned and the same smoothed or evened out when transmitted to the driving disk 20.

The fan blade 30 is suitably secured to a friction driven plate 31 by the rivet means 32, and simultaneously secured to the friction driven plate by said rivets 32 is a housing member 33. The means for yieldingly engaging the friction driving plate 20 with the friction driven plate 31 comprises a torsion or coiled spring 34, one end of which is seatable at 35 within the housing 33 and a sleeve portion 36 of the housing member 33 which is concentric with the shaft 10. Between the sleeve portion 36 of the driving disk or plate 31 and the shaft 10 is a bushing member 37, said member terminating in a circumferential flange 38. Between the bushing member 37 and the shaft 10 is a spacing member 39. A washer 40 and an end closure plate 41 complete the rear portion of the fan housing and form the spring chamber 42. From the foregoing, it will be understood that the torsion and compression spring 34 normally maintains the friction driven plate 31 in engagement with the friction driving plate 20, whereby the fan blades 30 will be rotated by the driving shaft 10 through the medium of the cushioned driving connection, including the driving and driven lugs 16 and 23, respectively, connected by the cushioning means 24.

As shown in Fig. 2 the cover plate 19 is suitably formed so that it provides an inner wall 43 concentric with the rim 21, whereby the cushioning means or springs 24 are maintained in position between the driving and driven lugs without danger of becoming displaced.

The invention claimed is:

1. A fan construction comprising in combination a fan blade, a driving shaft rotatably mounting said blade, a driving plate for frictionally rotating said fan blade, yielding means associated with said friction driving connection for maintaining the same in driving relation, a radially extending arm rigid with the shaft and associated with said friction driving plate, driving means on said plate and associated with said driving arm, and cushioning means interposed on both sides of said arm and said friction driving plate means for providing a resilient driving connection between said shaft and said friction driving plate.

2. A fan construction comprising in combination a driving shaft, a friction driven plate, a friction driving plate, yielding means normally maintaining said plates in frictional driving engagement, fan means associated with the driven friction plate, a plurality of driven lugs upon said driving plate, a spider including a plurality of driving arms, said arms being in spaced relation with said driven lugs, cushioning means between said driving arms and said driven lugs, and a driving shaft rigid with said spider for rotating said fan means.

3. A fan construction comprising in combination a driving shaft, a friction driven plate, a friction driving plate, yielding means normally maintaining said plates in frictional driving engagement, fan means associated with the driven friction plate, a plurality of driven lugs upon said driving plate, a spider including a plurality of driving arms, said arms being in spaced relation with said driven lugs, cushioning means between said driving arms and said driven lugs, a driving shaft rigid with said spider for rotating said fan means, rim means associated with said friction driving plate, and cover means associated with said friction driving plate and said rim means to form a cushioning chamber for the cushioning means between the driving arms and the driven lugs.

In witness whereof, I have hereunto affixed my signature.

D'ORSAY McCALL WHITE.